May 5, 1953  J. R. WILLETTS  2,637,373
COMBINED SEAT AND COVER
Filed Oct. 29, 1949
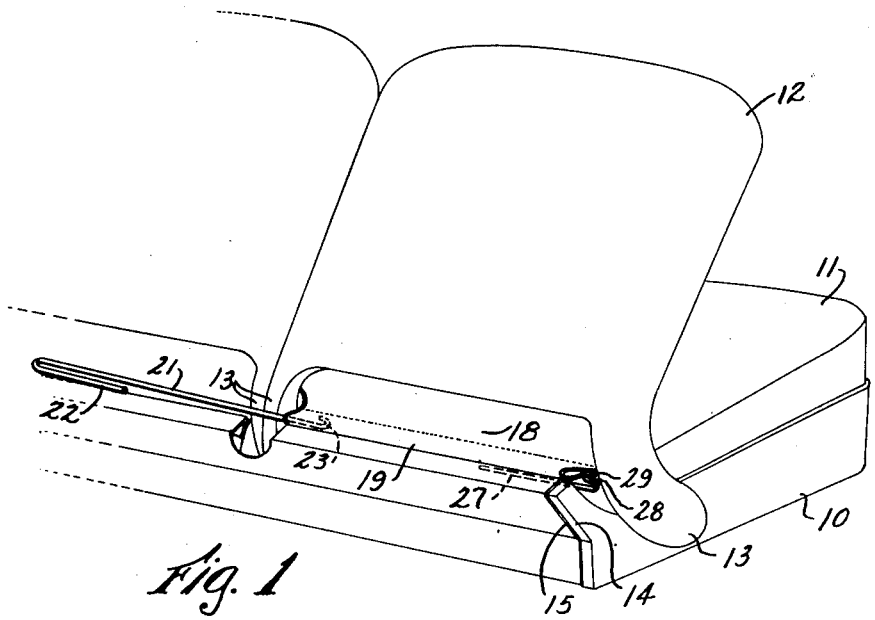
Fig. 1
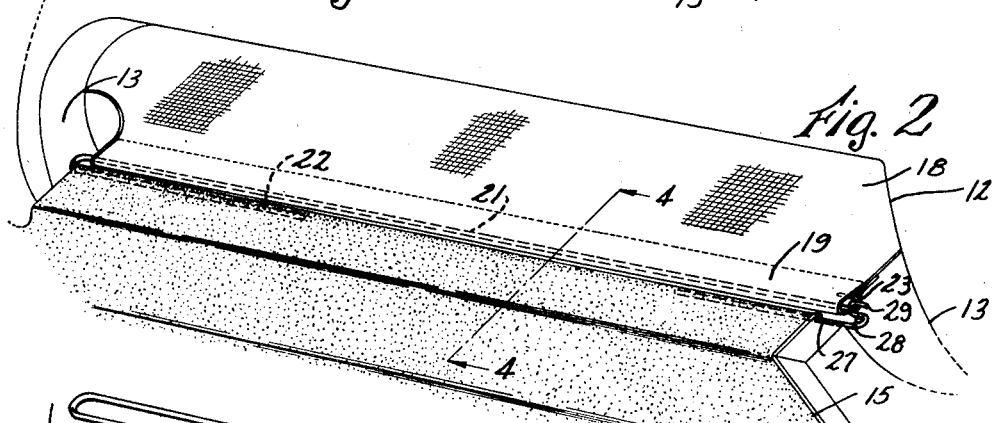
Fig. 2
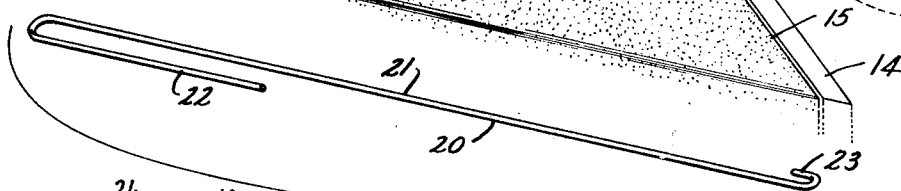
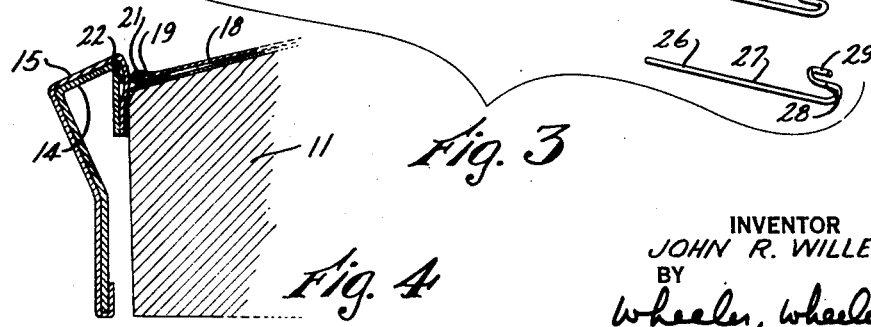
Fig. 3
Fig. 4
INVENTOR
JOHN R. WILLETTS
BY
Wheeler, Wheeler & Wheeler
ATTORNEYS Patented May 5, 1953

2,637,373

UNITED STATES PATENT OFFICE 2,637,373

COMBINED SEAT AND COVER

John R. Willetts, Milwaukee, Wis., assignor to Artcraft Manufacturing Co., Cambridge, Mass., a corporation of Massachusetts Application October 29, 1949, Serial No. 124,297

6 Claims. (Cl. 155—182)

1

This invention relates to the seat cover fasteners.

In the modern automobile, the installation of "seat covers" to overlie and protect upholstery of the automobile seats presents problems because of the universal use of metal in the upholstery and seat framing whereby to preclude the use of tacks. Since movability and replacement of seat covers is one of the objectives of this type of equipment, I have conceived the invention described below, based in part upon the discovery that in most automobile designs there is a tightly drawn and securely fastened section of floor rug material either built forming a cover for a foot rest adjacent the front seat or forming a cover for the back panel of the front seat frame. In the following description I shall refer to this foot rest, or panel, as a "foot rest" since it is against this portion of the automobile equipment that the feet of the passenger in the rear seat of the vehicle may rest or be braced.

It is the principal object of the invention to provide a simplified fastening means for attaching automobile seat covers to the seat. The invention has particular application to automobiles having non-removable front seat cushions.

In this connection it is an object of the invention to provide a set of rods having parts engageable between the rug and the foot rest proximate the rear margin of the front seat cushion and having cooperating parts interlocking with each other and engageable with a loop or hem disposed at the rear margin of the front seat cover. It is a further object to provide such rods with interengageable hook parts whereby the respective rods may be removably positioned in seat cover engaging position and locked together by the interengageable hooks.

Other objects will be more apparent from an examination of the following disclosure.

In the drawings:

Figure 1 is a rear perspective view of the front seat of an automobile showing the back rest portion of the seat swung forward to expose the rear looped margin of the front seat cushion cover, and showing the hooked rods partly engaged with the cover loop and with the rug covering the foot rest.

Figure 2 is an enlarged perspective view similar to that shown in Figure 1 wherein the seat cover fasteners are completely engaged so as to rigidly secure the seat cover to the seat.

Figure 3 is a view in spaced relation of a set of the hooked rods which comprise the fastener elements.

2

Figure 4 is a cross sectional view taken along the line 4—4 of Figure 2.

Front seat construction of "Tudor" automobiles conventionally comprises a seat frame 10, a seat cushion 11, and a back rest 12 which is pivotally connected to the seat frame 10 upon brackets 13 which permit the back rest to be swung forwardly to permit passengers to enter the rear seat of the automobile. Connected to the frame 10 is a foot rest 14 which is covered by a foot rest rug 15. As best shown in Figure 4, the foot rest rug 15 overlies the foot rest 14 and has a margin confined between adjacent portions of the foot rest and the rear margin of the seat cushion 11.

A seat cover 18 may be provided to protect the seat upholstery and which desirably overlies the seat cushion 11. The cover is securely positioned frontally of the seat 11 beneath a front panel of the frame 10. In order to secure the rear margin of the seat cover 18 firmly in position without removing the seat cushion, or where the cushion is non-removable, I provide the rear margin of the cover with an elongated loop or hem 19.

When the cover is properly fitted, the loop 19 extends adjacent but somewhat spaced from the rug which overlies the foot rest 14, so that in all positions of the cover, when in use, a tensioning member between the cover and the rug may properly function to keep the cover smooth and comfortable.

In order to engage the seat cover with the foot rest rug, a set of two interengageable rods, as best shown in Figure 3, are provided. These rods are of relatively stiff, springy material. A cover loop engaging rod, shown generally as 20, comprises a shank portion 21 having at one end an elongated hook 22 folded back substantially parallel with the shank 21, and having at its other end a relatively short hook 23. As best shown in Figures 1 and 2, the rod 20 may be inserted through the cover loop 19 with the short hook 23 foremost until the rod is completely fitted. When properly fitted the long hook 22 is engaged in the space between the rug 15 and the foot rest 14, as shown in Figure 4, and the shank 21 passes through the cover loop 19 to expose the hook 23 past the edge of the loop 19.

The locking rod, shown generally as 26 in Figure 3, comprises a shank portion 27 and a double bighted hook having a portion 28 folded back along the shank which carries a reverse hook 29 at an angle of 90° with the plane of the hooked portion 28. The shank 27, which comprises an extension of the hook legs, is adapted to be inserted into the clearance space between the rug 15 and the foot rest 14. The reverse hook 29 is adapted to interengage the short hook 23 of the cover loop engaging rod so as to securely fasten the seat cover to the foot rest rug.

When so positioned the rug is slightly deformed away from the foot rest where the respective rod portions 22 and 27 of the fasteners pass between the rug and the foot rest. This deformation tends to frictionally bind the rug against the inserted rods and the natural tension of the rug holds them firmly in position.

From the foregoing description taken in connection with the accompanying drawings it is seen that seat cover fasteners are provided which are readily and quickly attached so as to firmly secure the seat cover to the seat, and which are largely concealed from view when fastened. Seat covers thus fastened may be quickly and simply removed, and while they are in place the rods keep the rug and cover properly tensioned for good appearance.

I claim:

1. For a seat cover and seat positioned adjacent a tensioned rug, a locking rod adapted for engagement with the hooked end of a rod passed through the loop of an automobile seat cushion cover, said locking rod including a double bighted hook having opopsitely directed legs and a shank comprising an extension of one of the hook legs, said shank being adapted for engagement under said tensioned rug.

2. A seat having a frame with a frame cover, and a hemmed seat cover, in combination with a seat cover fastener comprising a shank engaged in the hem of the seat cover and a hook substantially parallel to the shank and engaged between the frame cover and the frame.

3. The device of claim 2 wherein the shank extends through and beyond the hem and is provided with a second hook at its end remote from the first hook, in further combination with a locking rod comprising a shank engaged between the frame cover and the frame and a hook engaged with said second hook.

4. The device of claim 3 in which said frame cover is tensioned respecting the frame and the fastener and locking rod are resilient whereby to keep the frame cover and seat cover smoothly tensioned.

5. A seat cover fastener comprising a shank having hooks at both ends of the shank, at least one of said hooks having substantial extent parallel to said shank.

6. The device of claim 5 in which the said hooks are co-planar at diametrically opposite sides of the shank.

JOHN R. WILLETTS.

References Cited in the file of this patent

UNITED STATES PATENTS

| Number | Name | Date |
|---|---|---|
| 1,862,476 | Fry | June 7, 1932 |
| 2,120,036 | Northop | June 7, 1938 |